(12) United States Patent　　(10) Patent No.: US 12,570,553 B2

McDonald　　(45) **Date of Patent: *Mar. 10, 2026**

(54) SYSTEM AND METHOD FOR GROUNDWATER REMEDIATION

(71) Applicant: HDR, Inc., Omaha, NE (US)

(72) Inventor: Shane D. McDonald, Malvern, PA (US)

(73) Assignee: HDR, Inc., Omaha, NE (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/468,398

(22) Filed: Sep. 15, 2023

(65) Prior Publication Data

US 2024/0002266 A1　　Jan. 4, 2024

Related U.S. Application Data

(63) Continuation-in-part of application No. 17/664,084, filed on May 19, 2022, now Pat. No. 11,767,233.

(Continued)

(51) Int. Cl.

| | |
|---|---|
| *C02F 1/04* | (2023.01) |
| *B01D 1/00* | (2006.01) |
| *B01D 1/14* | (2006.01) |
| *B01D 1/24* | (2006.01) |
| *C02F 1/08* | (2023.01) |
| *C02F 1/30* | (2023.01) |
| *C02F 1/52* | (2023.01) |
| *C02F 103/06* | (2006.01) |

(52) U.S. Cl.

CPC .............. *C02F 1/52* (2013.01); *B01D 1/0023* (2013.01); *B01D 1/14* (2013.01); *B01D 1/24* (2013.01); *C02F 1/048* (2013.01); *C02F 1/08*

(2013.01); *C02F 1/302* (2013.01); *C02F 2103/06* (2013.01); *C02F 2201/002* (2013.01); *C02F 2201/008* (2013.01)

(58) Field of Classification Search

CPC .. C02F 1/048; C02F 1/08; C02F 1/302; C02F 1/52; B01D 1/0023; B01D 1/14; B01D 1/24

See application file for complete search history.

(56) References Cited

U.S. PATENT DOCUMENTS

| | | | | |
|---|---|---|---|---|
| 3,351,536 A | * | 11/1967 | Fox ........................... | C02F 1/14 |
| | | | | 202/202 |
| 3,390,056 A | * | 6/1968 | Ingram ..................... | C02F 1/14 |
| | | | | 202/83 |

(Continued)

*Primary Examiner* — Jonathan Miller

(74) *Attorney, Agent, or Firm* — AVEK IP, LLC; Mark C. Young

(57) ABSTRACT

A groundwater remediation system includes a capillary media supported and positioned such that it is partially submerged into a groundwater source to be remediated. Groundwater is drawn into the submerged portion of the capillary media and further into the non-submerged portion of the capillary material via natural capillary action. As the water evaporates from the non-submerged portion of the capillary media, the dissolved solids within the water precipitate onto the media leaving the precipitated solids for reclamation or disposal and allowing the cleaned water vapor to disperse into the ambient air. In some embodiments, heat may be added to the media, water, or air to accelerate the evaporative process.

20 Claims, 12 Drawing Sheets

Related U.S. Application Data

(60) Provisional application No. 63/229,812, filed on Aug. 5, 2021, provisional application No. 63/190,337, filed on May 19, 2021.

(56) References Cited

U.S. PATENT DOCUMENTS

| | | | | |
|---|---|---|---|---|
| 4,504,362 | A * | 3/1985 | Kruse | F03G 6/065 |
| | | | | 202/180 |
| 4,585,523 | A * | 4/1986 | Giddings | B01D 1/22 |
| | | | | 165/133 |
| 4,882,071 | A * | 11/1989 | Bench | E21B 43/00 |
| | | | | 210/170.07 |
| 5,897,778 | A * | 4/1999 | Ishimori | C02F 1/28 |
| | | | | 210/691 |
| 6,258,273 | B1 * | 7/2001 | Gee | B09C 1/002 |
| | | | | 210/170.07 |
| 6,663,750 | B1 * | 12/2003 | Coon | C02F 1/14 |
| | | | | 202/202 |
| 7,166,188 | B2 * | 1/2007 | Kedem | C02F 1/047 |
| | | | | 159/48.2 |
| 7,604,710 | B2 * | 10/2009 | Haslem | B01D 1/20 |
| | | | | 405/224.1 |
| 7,815,776 | B2 * | 10/2010 | Wilson | B01D 1/30 |
| | | | | 202/202 |
| 9,770,672 | B2 * | 9/2017 | Peever | C02F 1/04 |
| 9,943,774 | B2 * | 4/2018 | Duesel, Jr. | B01D 1/14 |
| 10,035,080 | B2 * | 7/2018 | Meredith | B01D 5/0066 |
| 11,767,233 | B2 * | 9/2023 | McDonald | B09C 1/002 |
| | | | | 203/10 |
| 2014/0209450 | A1 * | 7/2014 | Peever | B01D 5/006 |
| | | | | 405/36 |
| 2017/0252667 | A1 * | 9/2017 | Simpson | B01B 1/005 |

* cited by examiner

100

Provide structure for media — 102

Place media in water source — 104

Provide heat to system — 106

Direct air across media — 108

Remove media — 110

Extract material from media — 112

SYSTEM AND METHOD FOR GROUNDWATER REMEDIATION

CROSS-REFERENCE TO RELATED APPLICATIONS

This application is a continuation-in-part of U.S. patent application Ser. No. 17/664,084, filed on May 19, 2022, the disclosure of which is hereby incorporated herein in its entirety by reference.

BACKGROUND

Environmental contaminants are an ongoing problem in industrialized nations. To avoid ground and water contamination, waste products from the mining of materials and from the production and processing of materials must be captured and disposed of. When such materials and waste products are not initially captured and disposed of, they are often stored in pits, mines, or on open ground, allowing potentially dangerous or undesirable chemicals and materials to leach into the ground and contaminate the underlying groundwater.

For example, coal ash produced in the burning of coal was often stored on the ground or in ponds surrounding an energy facility, allowing chemicals such as selenium, lithium, and arsenic to eventually seep into the groundwater under the storage site. Even if the storage site itself is eventually cleared, the contaminants in the ground and in the groundwater often remain for many years afterward.

Furthermore, strip mining and other mining methods, may disturb and expose previously buried contaminants that can then leach into the groundwater or surface water—a process sometimes referred to as "acid rock drainage" or ARD. The groundwater thus contains a high level of unwanted total dissolved solids (TDS), and is typically referred to as high TDS groundwater.

Because groundwater movement allows the chemicals to reach far beyond the original source, systems and methods for reclaiming source locations and remediating the groundwater been developed. For example, one known method requires pumping the groundwater to be remediated, such as from a well in the area of the contamination, into a treatment device comprising treatment technologies configured to remove specific contaminants, with the treated water returned to the ground or into a nearby stream or river. While generally effective in recovering some contaminants from groundwater, such operations require extensive equipment—pumps, pipes, filters, electrical stations, etc.—and are intrusive, expensive, and laborious to operate.

Thus, it can be seen that there remains a need in the art for alternative systems and methods for water remediation without the expense, equipment, and labor requirements of known systems and methods.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes systems and methods for groundwater remediation.

In one embodiment, a groundwater remediation system comprises a capillary media supported and positioned such that it is partially submerged into a pool of water to be remediated. The water may be groundwater (i.e., water below the underground water table) accessed through a well or pit in the ground, or may be water contained in a pit, hole, or other containment instrument or vessel.

With the capillary material thus positioned, contaminated (i.e., high TDS) groundwater is drawn into the submerged portion of the capillary media and further into the non-submerged portion of the capillary material via natural capillary action. As the water evaporates from the non-submerged portion of the capillary media, the dissolved solids within the water precipitate on the media as their solubility is exceeded in the evaporating water. Thus, the dissolved solids within the groundwater are drawn into the capillary media and deposited onto the capillary media as the water (minus the undesired contaminants) evaporates into the ambient air.

In further embodiments a heat source may be applied to the system, such as to the air, capillary media, and/or the groundwater to accelerate the subsequent evaporation of the water once drawn into the capillary media. In still further embodiments a fan may be used to accelerate the evaporation of the water from the non-submerged portion of the capillary media. In other embodiments, heat may be applied via a microwave heating means.

The capillary media is preferably supported by a support structure allowing the media to be placed in a desired position, and is replaced periodically, with the spent media disposed of and/or processed to reclaim metals, minerals, elements, or other precipitated materials from the media before disposal. For example, selenium, lithium, or other materials may be captured and reused in other applications.

Thus, In one aspect, the system and method of the present invention remove contaminants from groundwater or other contained water source. In another aspect, the precipitated materials on the capillary media may be reclaimed and reused from the spent media.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Embodiments of the invention include systems and methods for groundwater remediation. Various embodiments employ various components, features, and methods for removing contaminants from a water source using a capillary material.

Figure 1:
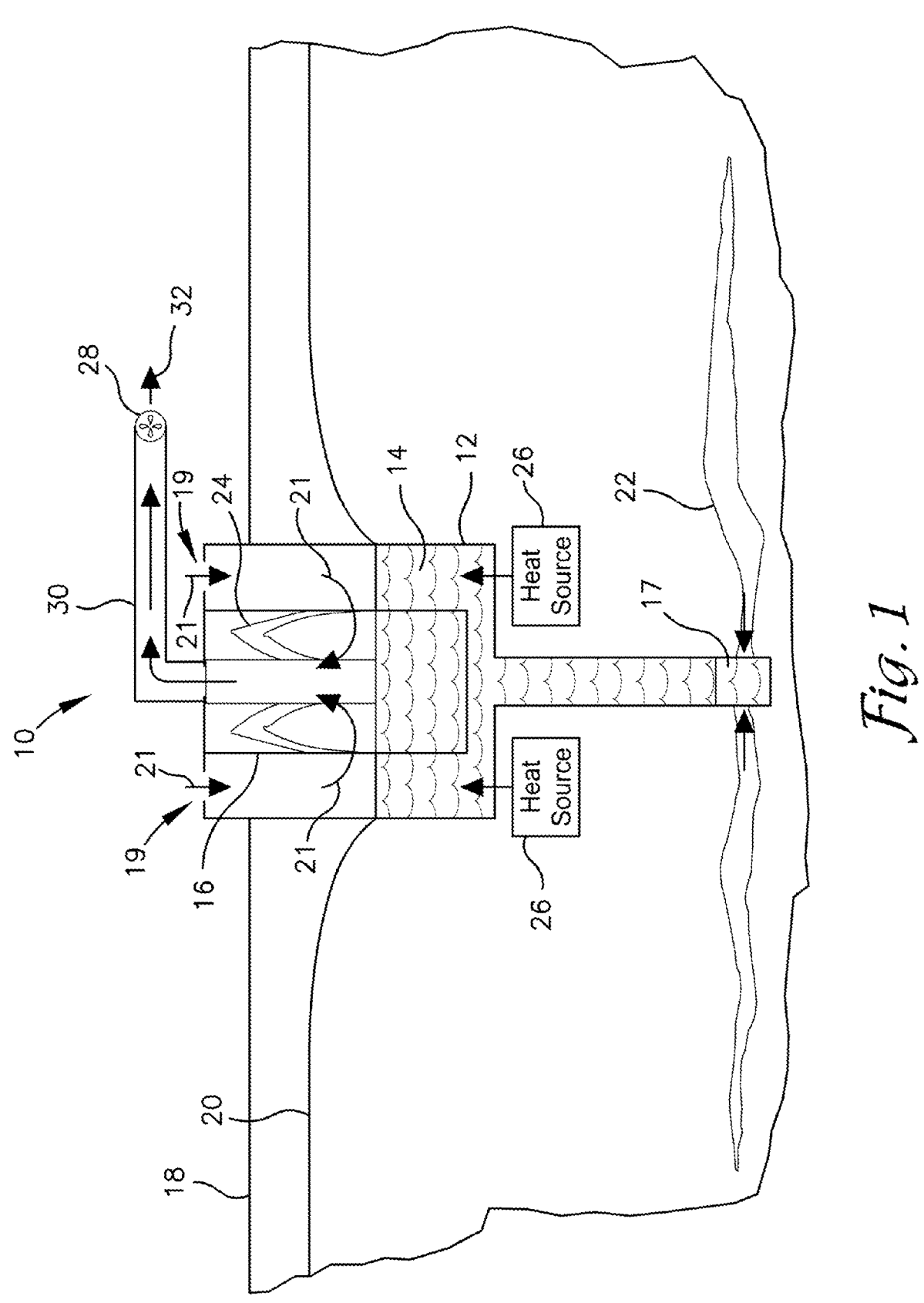
FIG. 1 is a diagrammatic view of a groundwater remediation system in accordance with an exemplary embodiment of the present invention.

Looking first to FIG. 1, a system for groundwater remediation in accordance with an exemplary embodiment of the present invention is depicted generally by the numeral 10. The groundwater remediation system 10 comprises a well 12 containing captured groundwater 14 needing remediation, namely groundwater having contaminants or other unwanted dissolved materials brought into the well 12 through well opening 17. A capillary media 16 is positioned partially submerged in the captured groundwater 14 within the well 12. As will be described in more detail below, the capillary media 16 is preferably supported by a structure, such as a frame, that positions the capillary media in a desired position within the well. The capillary media may be any type of media operable to draw in water via capillary action such a fibrous material, or any other natural or synthetic material.

Captured groundwater 14 originates from an underground water supply, i.e., the water table and aquifer 20 present under much of the earth's ground surface, with well 12 including an opening or pit 17 tapping through the earth into the aquifer 20. Alternatively, well 12 may include any other passage allowing groundwater 14 into the well 12. High TDS groundwater 22 may enter the aquifer 20 through any mechanism, such as through percolation from the ground surface 18.

Well 12 may be any type of well, vessel, container, opening or void as known in the art that allows access to captured groundwater 14. For example, in one embodiment well 12 may comprise a liner encircling a hole dug or bored into the ground surface 18.

The capillary media 16 is preferably positioned and supported in the well 12 by a support structure such as a frame, beam, truss, or the like that positions and supports the capillary media 16 in the desired partially submerged position. Most preferably, the support structure allows the capillary media 16 to be easily removed and replaced as required.

With the capillary media 16 thus positioned within the well 12, contaminated (i.e., high TDS) groundwater is drawn into the submerged portion of the media 16 and upwardly into the non-submerged portion of the media via natural capillary action. One or more openings 19 at the top of the well allow ambient air 21 to enter the well and circulate surround the media, allowing the water drawn into the media to evaporate. As the water evaporates from the non-submerged portion of the media 16, the dissolved solids within the water precipitate onto the media 16 as their solubility is exceeded in the evaporating water. Thus, the dissolved solids within the groundwater 14 are drawn into the capillary media and deposited onto the capillary media as the water (minus the undesired contaminants) evaporates into the ambient air.

Because the various materials and contaminants in the groundwater have different solubilities, those precipitated solid materials 24 are deposited across the capillary media 16 in a stratified arrangement, i.e., with less soluble materials generally being deposited lower on the capillary media 16 and more soluble materials generally being deposited higher on the capillary media 16. This stratification of the various materials permits easier extraction and reclamation of the materials from the capillary media 16 if desired. In conjunction with the materials being deposited onto the capillary media 16, the water formerly containing those materials is evaporated into the ambient air—minus those unwanted materials. Thus, the system as just described removes the contaminants from the groundwater and permits the now-cleaned water to evaporate into the air, without the use of any pumps or requiring any powered movement of the water.

It should be understood that while the exemplary embodiment of FIG. 1 shows use of the system in conjunction with groundwater 14 in a well 12, the system may likewise be used in conjunction with, for example, sludge water in a pit or hole near a mining site, or with water contained in an abandoned mine, without requiring a specific well 12 or liner configuration.

Looking still to FIG. 1, in further embodiments the well 12 may include one or more heat sources 26 operable to provide heat to the system 10, such as to the groundwater 14 within the well 12, to the capillary media 16, to the air drawn into the system 21, or combinations thereof, to accelerate the evaporative process. The heat source 26 may be a gas heater, electric heater, solar heater, microwave heater, or other type of heating element or generator known in the art. In further embodiments the system 10 may include a fan 28 operable to draw air across the capillary media 16 to accelerate the evaporative process. In this embodiment, an exhaust tube 30 directs the wet air out of the well and into the atmosphere. In further embodiments, the wet exhaust air 32 may be directed to a condensing unit that facilitates the conversion of the wet air back to clean liquid water, which may then be used or directed to a nearby stream or river.

Figure 2:
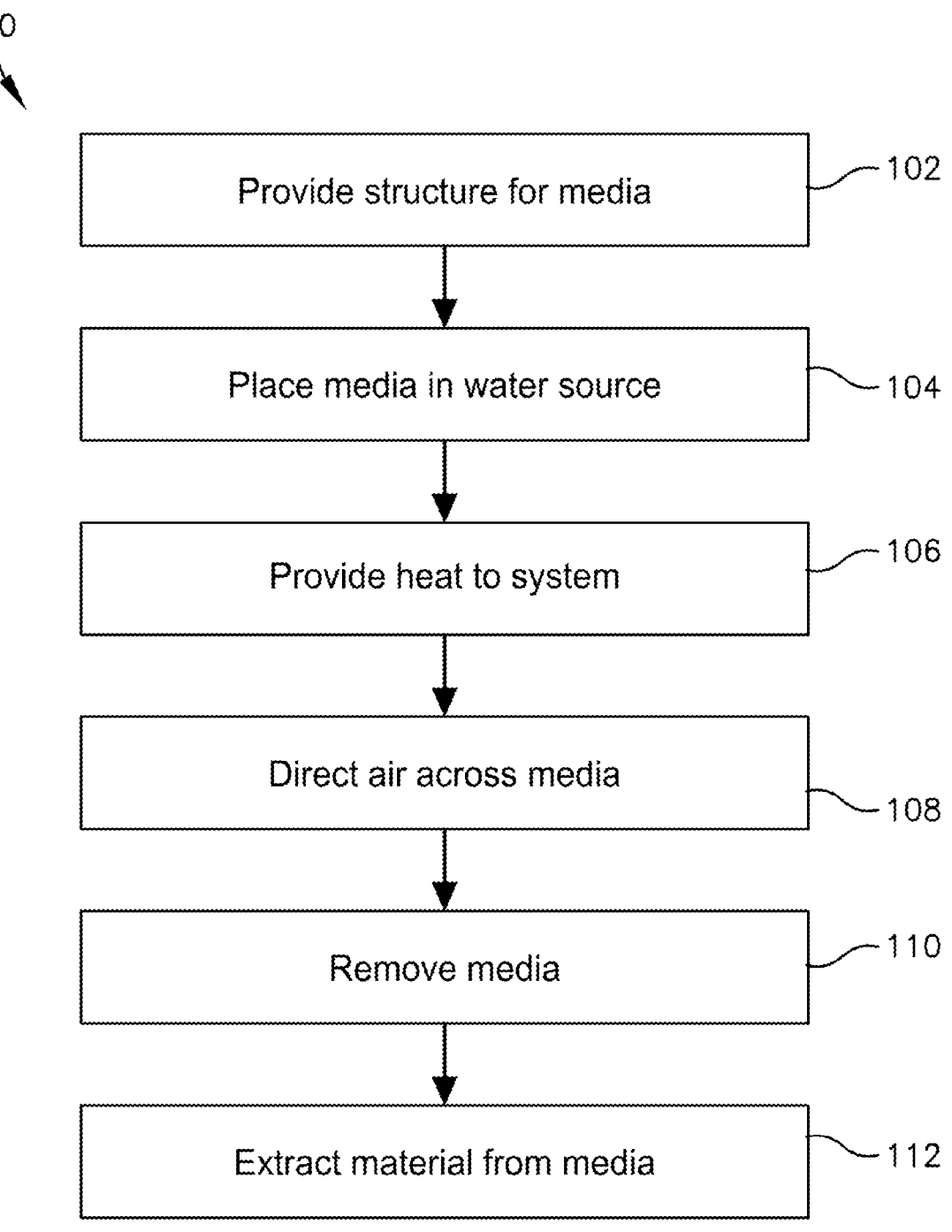
FIG. 2 is a flow diagram of a method of groundwater remediation in accordance with an exemplary embodiment of the present invention.

With the structure and general operation of the system 10 set forth, looking to FIG. 2, a method of remediating groundwater is depicted generally by the numeral 100. With reference back to FIG. 1, at block 102 a structure is provided for supporting and positioning a capillary media. At block 104, the media is placed onto the structure and positioned such that it is partially submerged into a water source from which contaminants are to be removed.

At block 106, a heat source provides heat to the system to accelerate the evaporation of the water once drawn into the capillary media. It should be understood that the heat source may heat the water, the capillary media, the air, or combinations of those. It should be further understood that in other embodiments that no external heat source may be applied.

At block 108, air is directed across the capillary media to accelerate the evaporation of water. As described above, as the water evaporates from the capillary media the solids within the water are precipitated to the capillary media.

At block 110, the capillary media is removed and replaced with new media to allow further removal of additional contaminants if necessary.

Finally, at block 112, the materials precipitated onto the capillary media are extracted from the media for reclamation, reuse, or disposal.

It should be understood that the steps as just described are exemplary, and that various combinations of the described steps are within the scope of the present invention. For example, in some embodiments, no heat may be applied to the system to accelerate the evaporation of the water from the capillary media. In other embodiments, the air may circulate naturally around the capillary media, with no fan or air mover to accelerate or direct the air flow. These and other embodiments are within the scope of the present invention.

Figure 3:
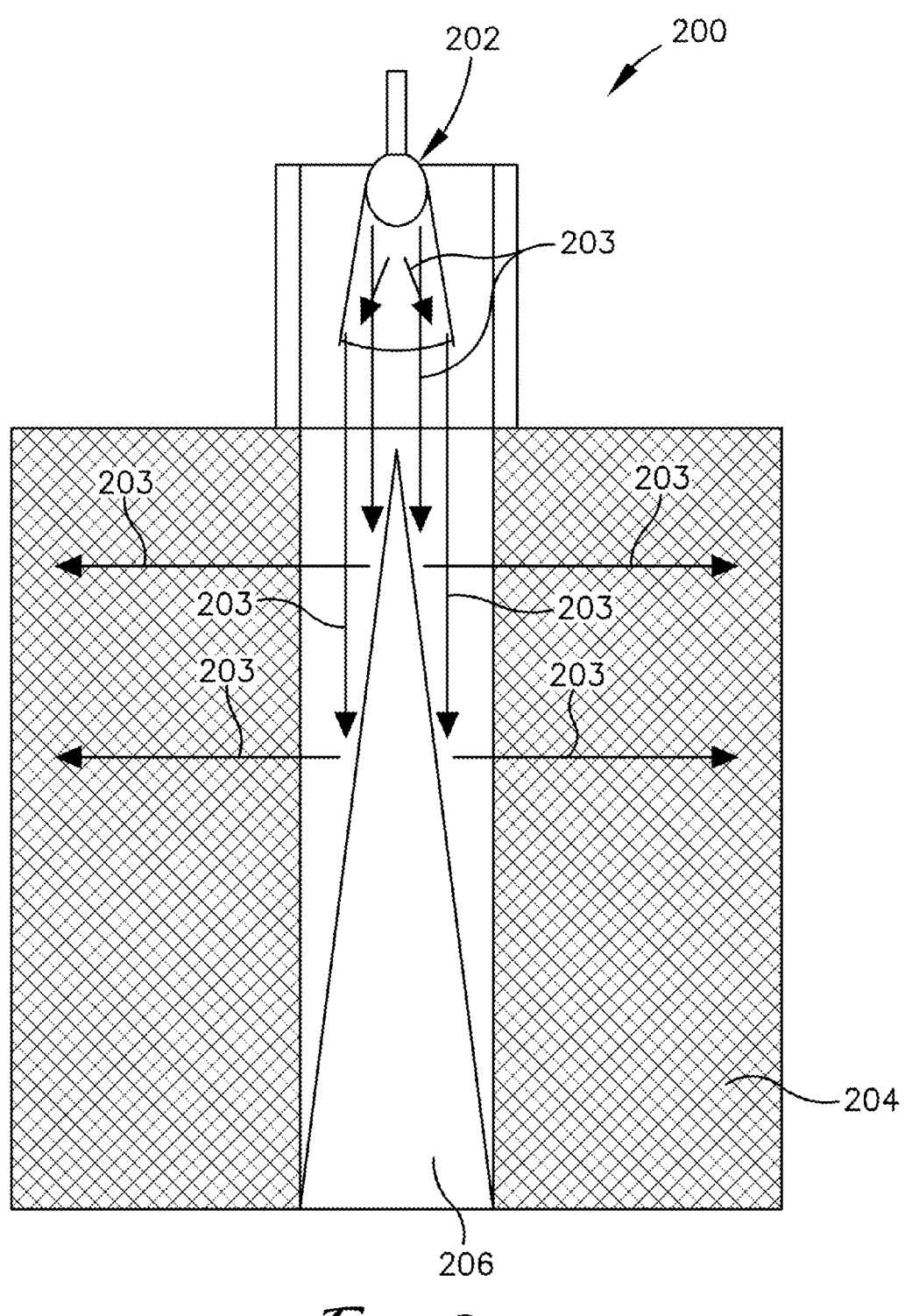
FIG. 3 is a diagrammatic view of a groundwater remediation system having microwave heating of capillary media in accordance with an exemplary embodiment of the present invention.

Turning to FIG. 3, an exemplary embodiment employing microwave heating of the capillary media is depicted generally by the numeral 200. Microwave heating provides an efficient way to add heat to the wicking well system to enhance evaporation. The system includes a magnetron microwave emitter 202 operable to emit microwaves 203. A downwardly facing parabolic focus reflector 203 directs the emitted microwaves downwardly towards the center of the capillary media 204. A conical reflector 206 positioned within, or surrounded by, the capillary media 204 reflects the downwardly directed microwaves outwardly and into the capillary media 204. Preferably, the frequency of the microwaves is tuned to cause the water molecules of the TDS water to vibrate, heating the water directly. In one embodiment, the magnetron microwave emitter is positioned within the downward-facing parabolic reflector, or connected to a downward aimed wave guide, in the exhaust line just above the capillary media. In other embodiments, the capillary media is seeded with materials that are also heated by microwaves to increase the efficiency of the microwave heating.

Figure 4:
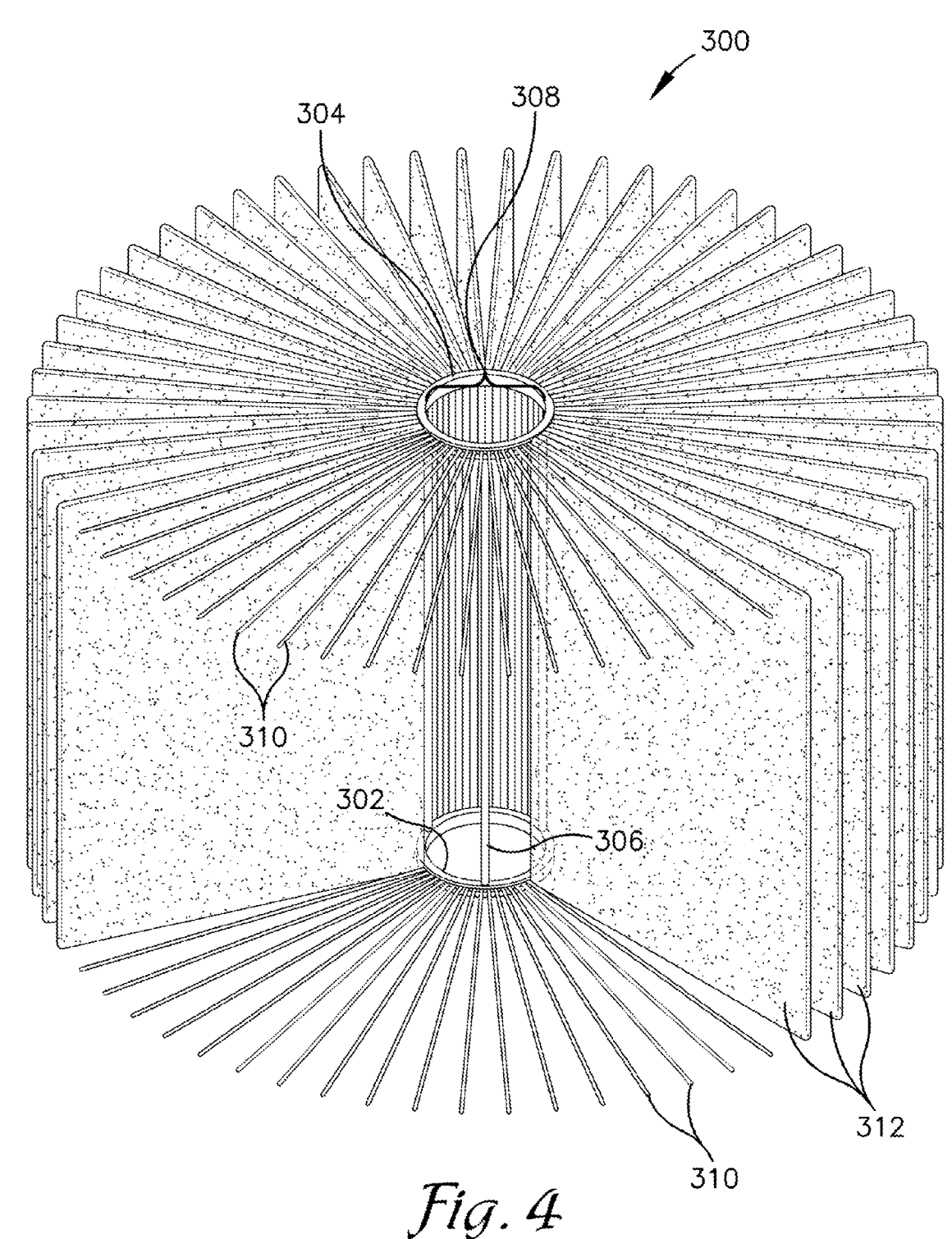
FIG. 4 is a perspective view of a support structure and capillary media in accordance with an exemplary embodiment of the present invention.

Turning to FIG. 4, a capillary media and support structure for use in the system and method of the present invention is depicted generally as numeral 300. A center support structure comprises a lower ring 302 and an upper ring 304 connected by a plurality of vertical support rods 306. The center structure forms a cylindrical center section 308.

A series of horizontal support rods 310 extend outwardly like spokes from each of the lower ring 302 and the upper ring 304, with the upper and lower support rods aligned in pairs. A sheet or pocket of capillary media material 312 is attached over each pair of upper and lower support rods so that the material 312 is held vertically upright, extending between the upper and lower rods.

As can be seen in FIG. 4, with capillary media material attached to each spoked pair of support rods, there is space between each section of material to allow air flow to facilitate the evaporation of water from the media as previously described.

With reference back to FIG. 1, it can be seen that the support structure and capillary media of FIG. 4 may be placed partially submerged into the groundwater to be remediated (e.g., media 16 in FIG. 1). And, with reference to FIG. 3, it can be seen that the microwave heating of the capillary media as described with respect to that figure may be employed in conjunction with the support structure of FIG. 4.

It should be understood that the cylindrical shape and spoked arrangement of the capillary media and support structure are exemplary, and that other configurations of structure and media may be used in accordance with the present invention. For example, the capillary media may be configured as a single cylindrical cartridge, may be configured as multiple rectangular or square sections of media stacked in a cubical arrangement, or may be any other arrangement of media and support structure.

Figure 5:
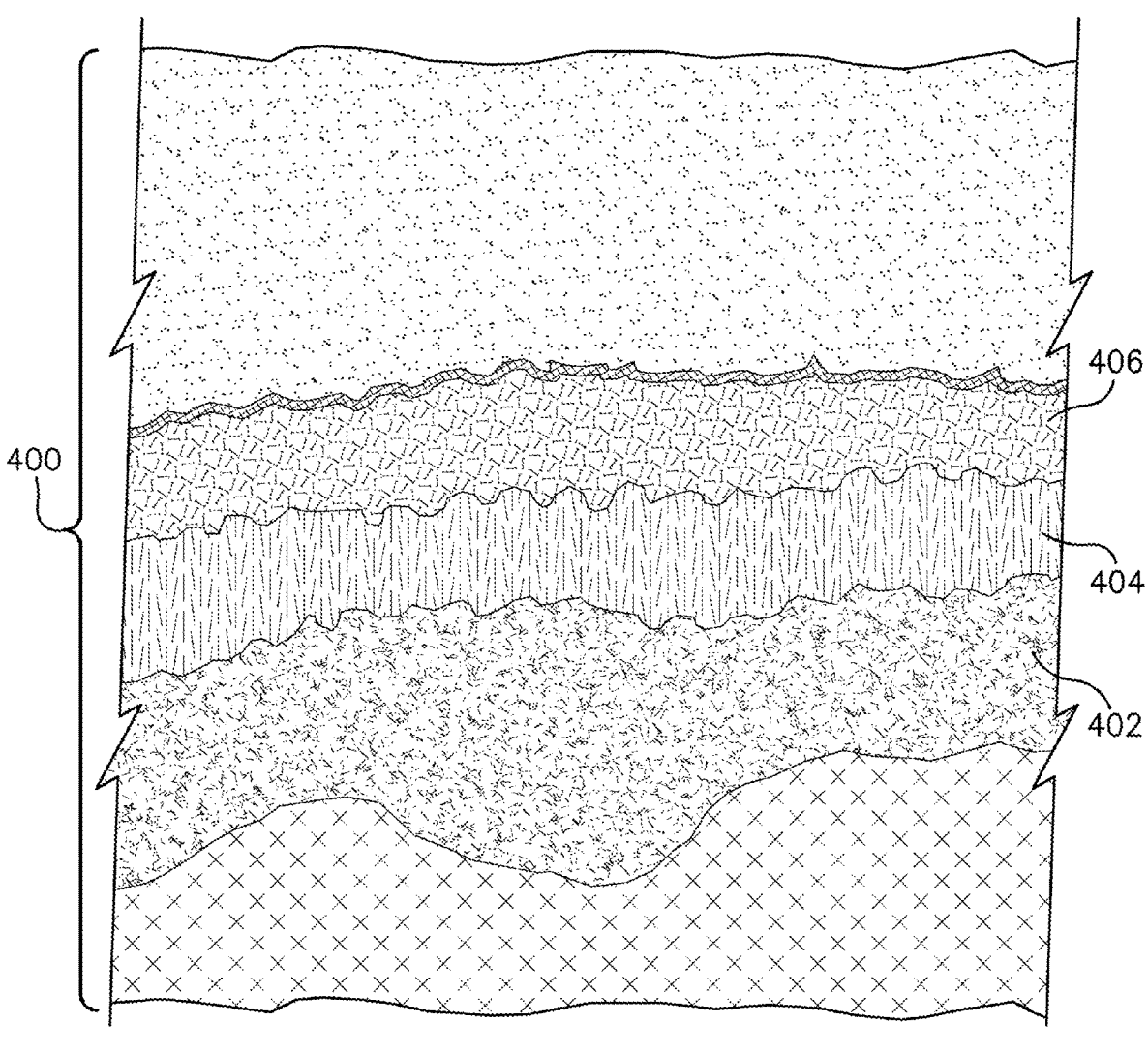
FIG. 5 is a close-up partial view of a section of capillary media showing stratification of materials extracted from groundwater in accordance with an exemplary embodiment of the present invention.

With reference to FIG. 5, as described above, because the various materials and contaminants in the groundwater have different solubilities, the precipitated solid materials are deposited across the capillary media in a stratified arrangement, i.e., with less soluble materials generally being deposited lower on the capillary media and more soluble materials generally being deposited higher on the capillary media. As depicted in FIG. 5, on an exemplary section of capillary media 400, the various materials are stratified across the media in various bands, depicted as bands 402, 404, 406, etc. on the media, with each band comprising a particular material or element. The stratification of the various materials permits easier extraction and reclamation of the materials from the capillary media as previously described.

It should be understood that using a capillary media to assist in evaporating water and capturing dissolved solids is limited by both the height to which water will be wicked upward into the capillary media as well as by the rate at which it will be wicked upward. Wicking occurs in two steps, capillary rise and diffusion. Capillary rise occurs until the wicking water reaches a specific height in the capillary media, known as the Jurin Height, above which the water is propagated upward by diffusion (see, e.g., Mirzajanzadeh, Morad, Deshpande, Vikram S., Fleck, Norman A. 2018. *Water rise in a cellulose foam: By capillary or diffusional flow?, Journal of the Mechanics and Physics of Solids*, Elsevier Ltd.).

The vertical distance at which the Jurin Height occurs for a particular wicking material is determined by the physical properties of the wicking material. The speed of capillary rise diminishes upward at an exponential rate. Once water rising in a capillary media reaches the Jurin Height, the capillary force wanes and diffusion takes over as the force that moves water upward. When diffusion becomes the force moving the water, the exponent governing water rise is cut in half and the water rise is diminished at a faster rate. The effect of this is that greatest movement of water occurs immediately above the water source and curtails rapidly above the Jurin Height. Thus, the Jurin Height occurs in the capillary material a few inches above the water source.

The result is that the greatest exchange of water through evaporation must occur within a few inches of the water source and that using capillary action to move water vertically more than a few inches is not practical. Any method that combines wicking and evaporation that does not consider these fundamentals of capillary action will not be efficient and likely is not practical to implement. The method and apparatus of the current invention accounts for these potential drawbacks and provides a more efficient method for combining wicking and evaporation to achieve the goal of removing dissolved solids from the source water.

Alternative embodiments of an apparatus and method in accordance with the present invention will now be described with reference to FIGS. 6 through 12.

Figure 6:
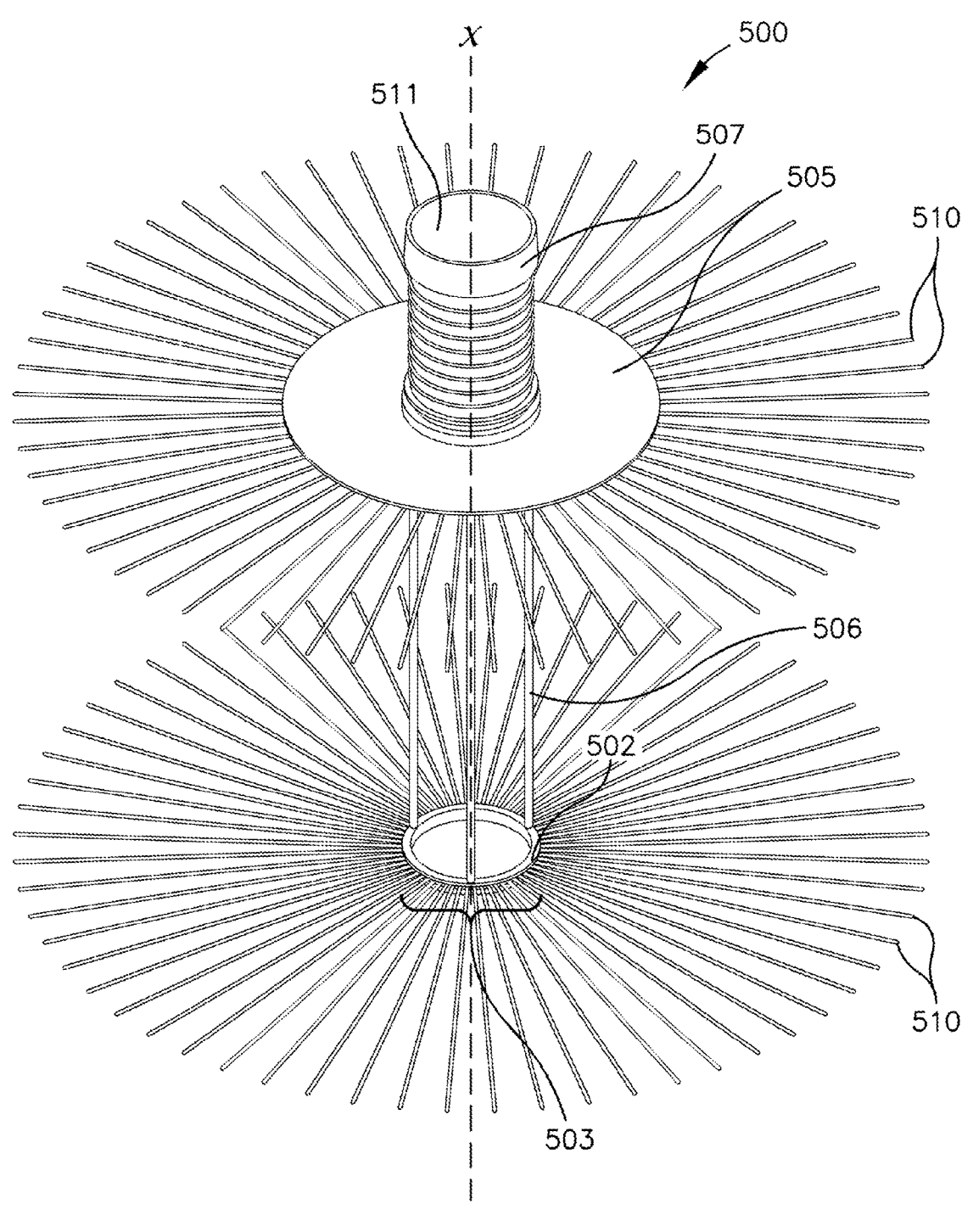
FIG. 6 is a perspective view of a support structure in accordance with an exemplary embodiment of the present invention.

Looking to FIG. 6, a support structure for supporting a capillary media is depicted generally as numeral 500. The support structure 500 comprises a generally cylindrical center support 503, with the center support 503 comprised of a lower ring 502 connected to an upper ring (not visible in this view) by a plurality of vertical support rods 506, such that the connected lower ring 502, upper ring, and vertical support rods 506 form the generally cylindrical center support 503 (in a manner similar to that as described with respect to the embodiment of FIG. 4).

A circular flange 505 extends outwardly from the center axis x of the support structure 500, positioned above and supported by the plurality of support rods 510 at the upper end of the structure and axially aligned with the center axis x. The circular flange 505 is attached to at least one of the support rods 510, and is preferably attached to multiple support rods 510 to prevent the flange 505 from moving from its alignment with the center axis x and to provide further rigidity to the overall structure 500.

A tubular cylindrical exhaust riser 507 is attached to and extends upwardly from the upper surface of the circular flange 505, with the open upper end 511 of the exhaust riser 507 thus positioned above the rest of the structure 500. The open lower end of the exhaust riser is positioned around an axially-aligned circular aperture formed through the center of the flange, such that air may flow upwardly through the structure and through the exhaust riser 507 (as will be described in more detail below), with the exhaust riser 507 thus acting as small chimney to contain and direct the upwardly flowing air.

Figure 7:
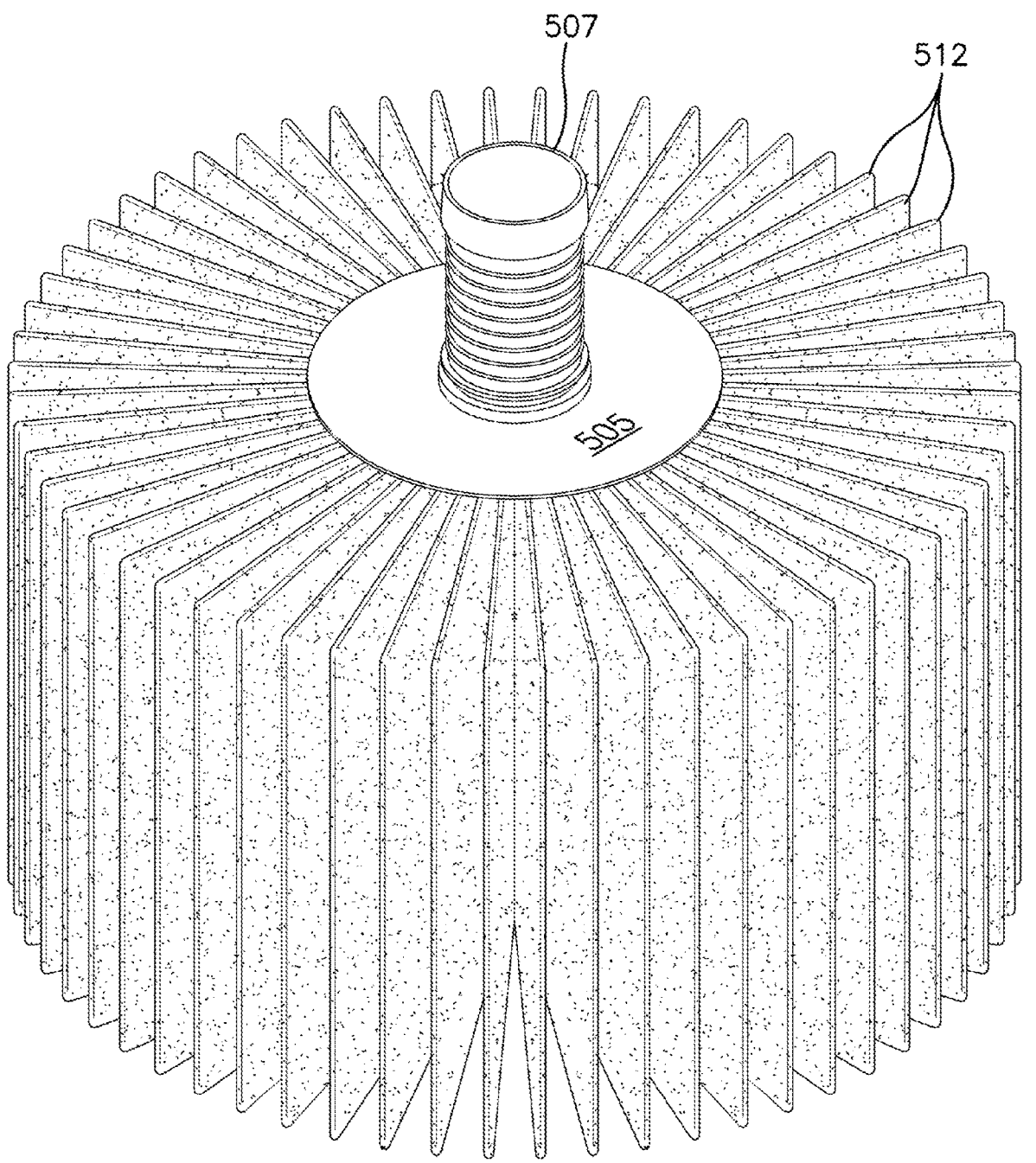
FIG. 7 is a perspective view of the support structure of FIG. 6 supporting a capillary media in accordance with an exemplary embodiment of the present invention.

Looking to FIG. 7, a sheet or pocket of capillary media material 512 is attached over each pair of upper and lower support rods of the support structure so that the material 512 is held vertically upright, extending between the upper and lower rods. As can be seen in FIG. 7, with capillary media material 512 attached to each spoked pair of support rods, a space is formed between each section of material to allow air flow therethrough to facilitate the evaporation of water from the media as previously described. Looking to FIGS. 6 and 7 together, it can be seen that with the capillary media attached to the support rods that a space is formed between adjacent sheets of capillary media and that a cylindrical shaped opening remains between the vertically extending support rods at the center of the structure. Thus, as will be described in more detail below, air may flow through the capillary media 512 to the center opening of the structure, and then to and through the exhaust riser 507.

Figure 8:
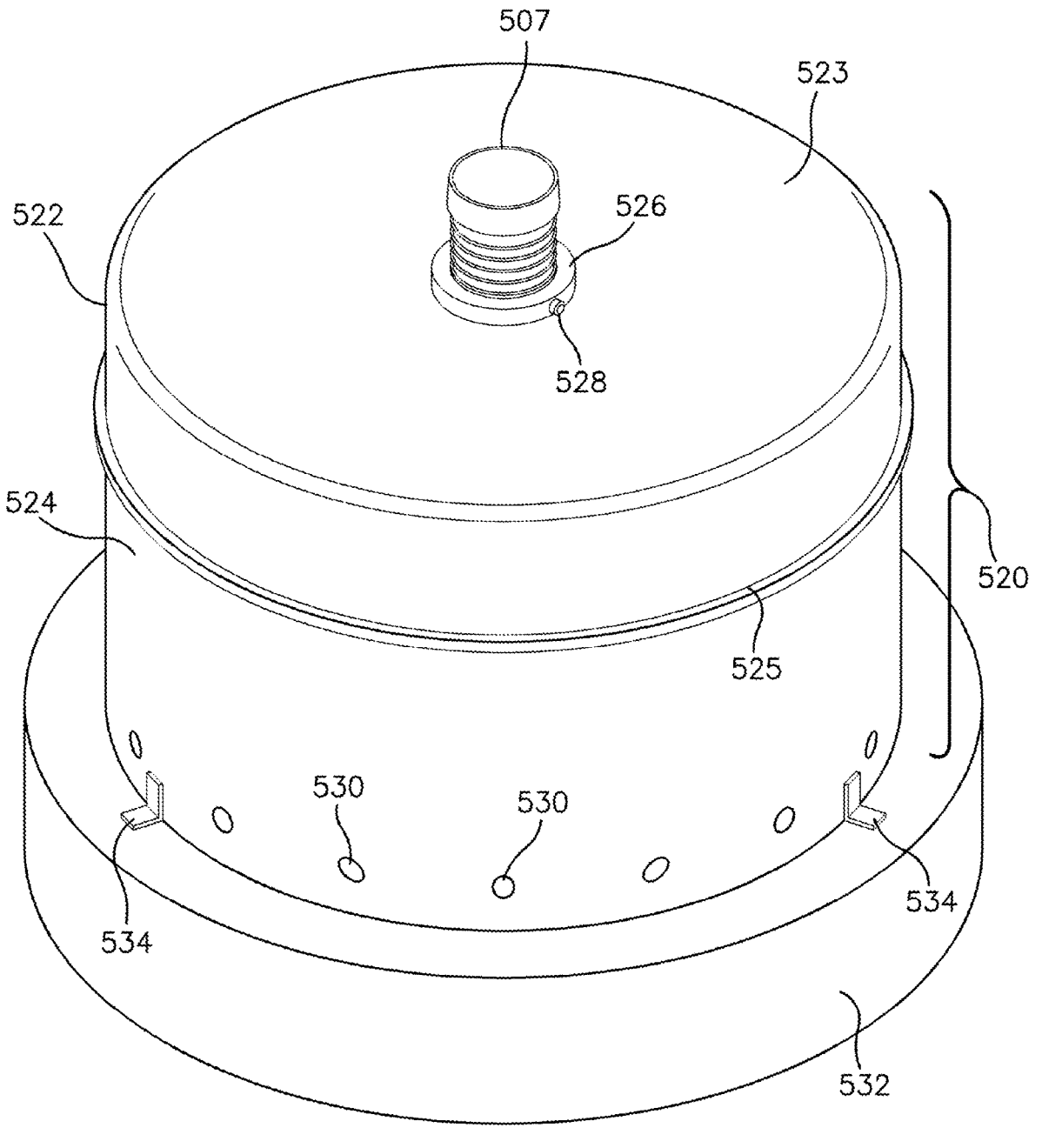
FIG. 8 is a perspective view of an enclosure housing the support structure and capillary media of FIG. 7.

Turning to FIG. 8, the support structure and capillary media as just described are enclosed within an open-bottom, cylindrical cowling 520 having separable upper 522 and lower 524 portions, with the exhaust riser 507 of the structure extending upwardly through an opening in the top surface 523 of the upper portion 522 of the cowling 520. A protruding lip 525 extending circumferentially around the lower end of the upper portion 522 overlaps the lower portion 524 of the cowling 520 and seats the upper portion 522 onto the lower portion. A clamp collar 526 is attached to the upper surface 523 of the upper portion 522 of the cowling 520, positioned around the opening though the upper surface 523. A setscrew 528 allows the clamp collar 526 to be secured to the upwardly extending exhaust riser 507.

Figure 9:
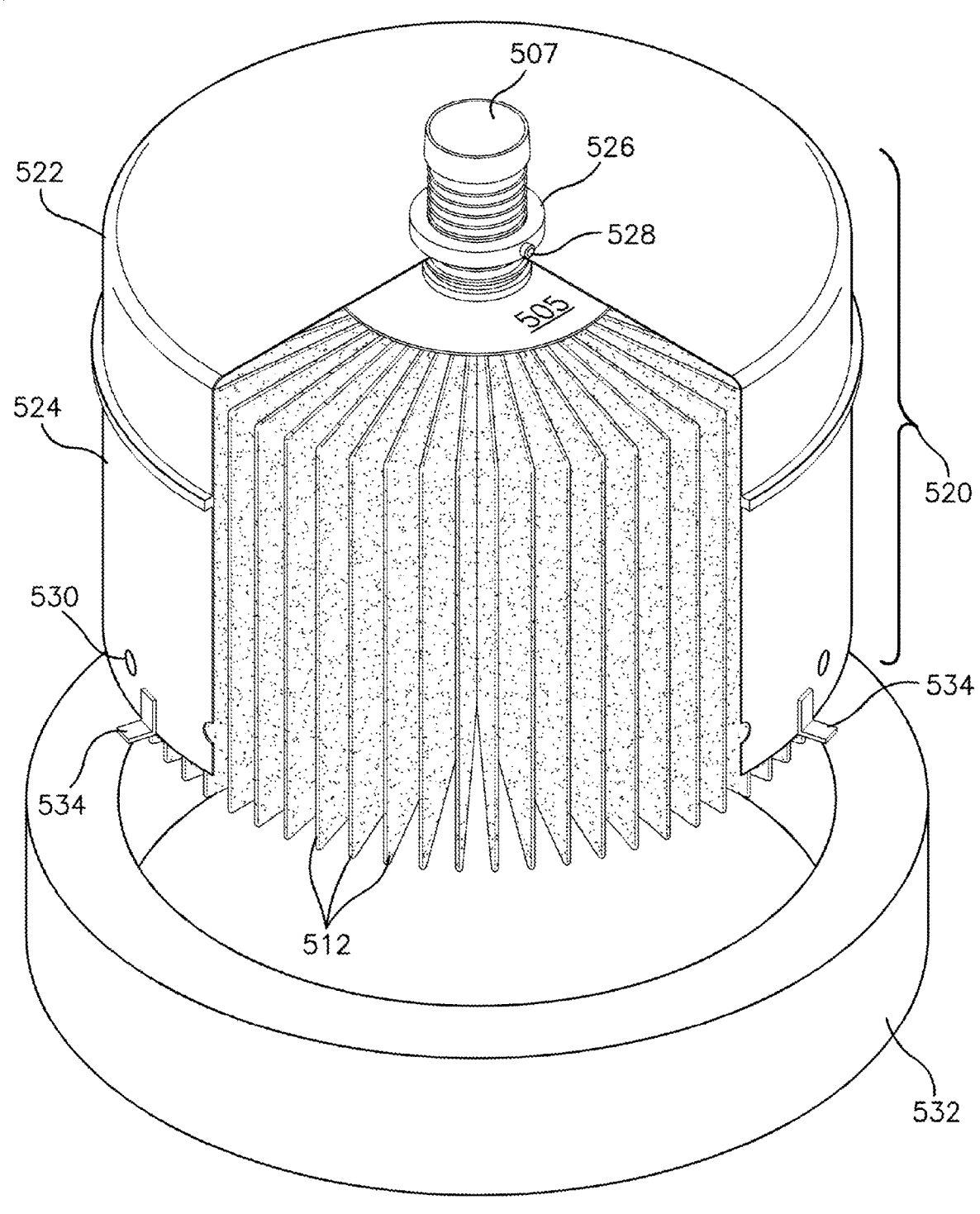
FIG. 9 is a perspective cut-away view of the enclosure of FIG. 8 revealing the capillary media contained therein.

As best seen in FIG. 9, with the upper portion 522 of the cowling 520 seated to the lower portion 524 and the setscrew 528 of the clamp collar 526 secured to the exhaust riser 507, the support structure and capillary media 512 are secured within the cowling 520.

Looking to FIGS. 6 and 9 in conjunction, it can be seen that with the exhaust riser 507 inserted through the hole in the top of the upper portion 522 of the cowling 520, the flange 505 is positioned against the top inside surface of the upper portion 522 and that with the clamp collar 526 secured to the exhaust riser that the entire structure 500 is secured to the upper portion 522 of the cowling 520, with the clamp collar preventing the structure from moving downwardly and the flange 505 preventing the structure from moving upwardly, thus the structure and capillary media are effectively suspended from the upper portion 522 of the cowling 520.

Furthermore, looking to FIGS. 8 and 9 in conjunction, with the setscrew 528 of the clamp collar 526 loosened, it should be understood that as just described the upper portion 522 of the cowling 520 may be lifted and removed from the lower portion 524 to allow inserting or removing the structure and capillary media 512 into or from the cowling 520.

Turning again to FIG. 8, a series of vent holes 530 are arranged circumferentially around the lower region of the lower portion 524 of the open-bottom cowling 520 to allow external air to flow into the cowling 520. The entire cowling 520 (and enclosed structure and capillary media) is positioned on a ring shaped float 532 and attached to the float 532 by a series of "L" brackets positioned around the lower perimeter of the open-bottom lower portion 524 of the cowling. Thus, the entire cowling 520 (and enclosed structure and capillary media) is attached to the float 532 to allow the assembled device to be deployed into a body of water where it will float on the surface of the water. Float base 532 is preferably comprised of a buoyant material, such as Styrofoam or other floatable material, to allow the float 532 and the structure 500 supported thereon to float on the surface of a body of water in which the device is disposed.

As can also be seen in FIG. 9, with the structure 500 and capillary media 512 suspended within the cowling 520 as just described, and with the cowling positioned onto and in axial alignment with the ring float base 532, that the lower portion of the structure 500 and capillary media 512 extend through the inner opening of the ring float 532 and into the body of water into which the assembly is placed. Thus, the entire assembly floats on or near the surface of the water (i.e., a portion of the ring float 532 will submerge beneath the surface of the water due to the weight of the assembly), with the lower portion of the capillary media 512 extending into the water.

With the basic structure of the groundwater remediation system set forth, the configuration and operation of various embodiments of the system in accordance with the present invention will now be described with reference to diagrammatic views of FIGS. 10 through 12.

Figure 10:
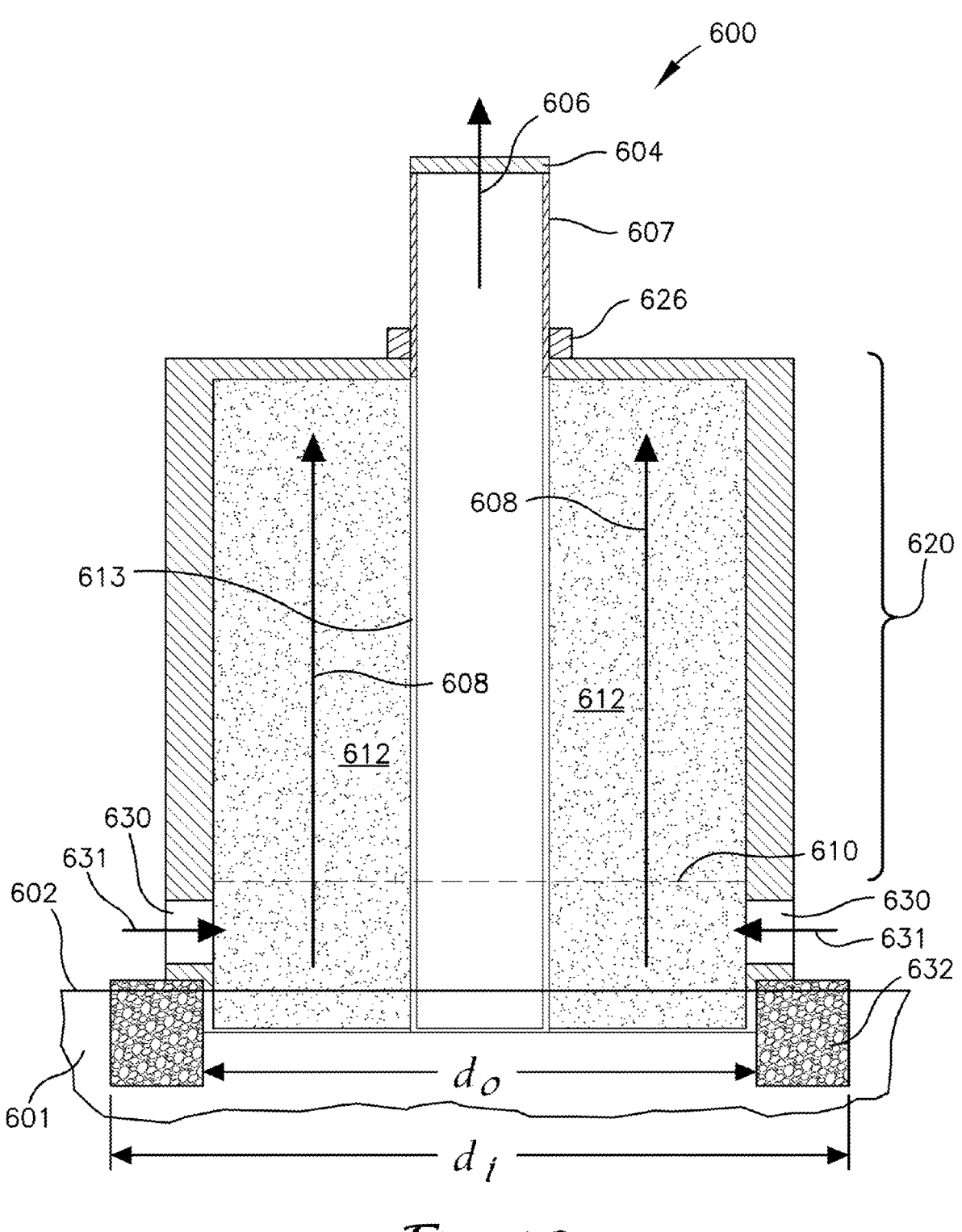
FIG. 10 is a diagrammatic cross-sectional and airflow view of an enclosure and capillary media in accordance with a first exemplary embodiment of the present invention.

Looking to the diagrammatic cross-sectional view of FIG. 10, an exemplary embodiment of the water remediation system is depicted generally as numeral 600. In the manner as described above, the support structure and capillary media 612 are attached to and suspended within the cowling 620, with the cowling positioned on and attached to the float ring base 632. Float ring 632 has an inner opening having a diameter of $d_i$ and an outer diameter of $d_o$, such that, as described above, the bottom edge of the lower portion of the cowling 620 rests on the float ring base 632, with the lower portion of the capillary media 612 extending downwardly through the inner opening of the float ring base 632. As described with respect to the embodiments above, the cowling 620 is preferably attached to the float ring base via "L" brackets, adhesive, or other attachment means. Vent holes 630 formed through and positioned around the lower portion of the cowling 620 allow air to flow into the cowling.

In the embodiment depicted, the cowling 620 is a single piece, having non-separable upper and lower portions, with the structure and capillary media 612 attached to and suspended in the cowling 620 by the exhaust riser 607 and clamp collar 626 as previously described. In this embodiment a fan 604 or other air moving device is positioned on or in the exhaust riser 607 to direct airflow 606 from the exhaust riser, which thus induces airflow 631 into the vent holes 630 in the lower portion of the cowling. Dry air thus flows into the cowling through the vent holes 630, and travels generally upwardly across and through the capillary media 612 and through the center of the support structure 613, with wet air (having absorbed moisture from the capillary media) exhausted through the exhaust riser 607.

Looking still to FIG. 10, with the entire assembly disposed within a body of water 601 (e.g., a water table to be remediated), the lower portion of the capillary media 612 extends into the water 601, with the assembly floating near the surface 602 of the water. With the capillary media extended into the water 600, water is drawn up into the capillary media 612 as depicted by arrows 608 in the figure, with air drawn into the system through vent openings 630 via fan 604 and across the capillary media 612 as described above. Preferably, the vent openings 630 are positioned to allow incoming airflow into the system just above the surface level of the water 602 so as to focus the incoming airflow onto a zone of the capillary media 612 just below the Jurin Height 610 on the capillary media 612. As discussed above, the Jurin Height is the area in the capillary media where the most vigorous capillary action occurs, thus focusing the incoming airflow onto the area of capillary wicking just below that height provides for optimal conditions for evaporation and wicking.

In operation, the fan in the exhaust path directs air flow in through the vent openings in the cowling, across and through the capillary media, and to the central exhaust riser where the wet air is expelled from the system. The radial arrangement of the capillary media sections optimizes exposure of the capillary media surface area to the moving air. And, the combination of the radial arrangement of the capillary media and the airflow directed by the cowling makes the system more efficient at evaporating water than simply exposing the capillary media to undirected air flow.

Figure 11:
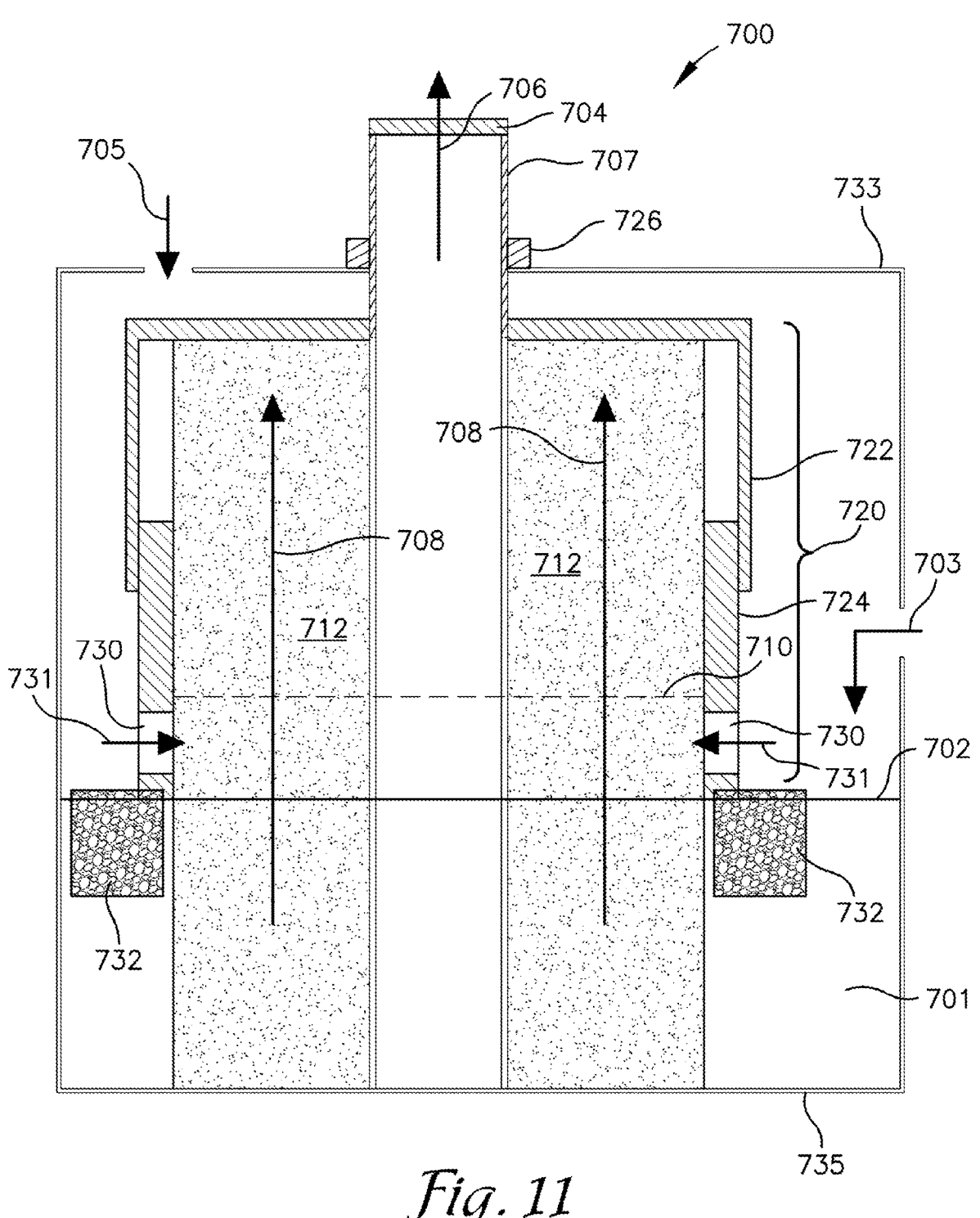
FIG. 11 is a diagrammatic cross-sectional and airflow view of an enclosure and capillary media in accordance with a second exemplary embodiment of the present invention.

Turning to FIG. 11, a water remediation system in accordance with another exemplary embodiment of the present invention is depicted generally by the numeral 700. Because the water remediation system of the present invention is designed to capture dissolved solids from contaminated water, it can be anticipated that solids precipitating on the media may quickly use up the available space within the capillary media, particularly within the Jurin zone where the most capillary action takes place. Thus, in some embodiments, it may be advantageous for additional capillary media to be available to store precipitated solids and for the water level across the capillary media to be variable.

Looking to the embodiment of the diagrammatic view of FIG. 11, the water remediation system 700 includes a cowling 720 comprised of an upper portion 722 and a lower portion 724, positioned on and attached to the float ring base 732, with the entire cowling and base further disposed within an outer chamber 733. As described with respect to the previous embodiments, a support structure and capillary media 712 are attached to and suspended within the cowling 720, with the cowling positioned on and attached to the float ring base 732. Float ring 732 has an inner opening an outer diameter such that, as described above, the bottom edge of the lower portion of the cowling 720 rests on the float ring base 732, with the lower portion of the capillary media 712 extending downwardly through the inner opening of the float ring base 732. As described with respect to the embodiments above, the lower portion of the cowling 720 is preferably attached to the float ring base via "L" brackets, adhesive, or other attachment means. Vent holes 730 formed through and positioned around the lower portion of the cowling 720 allow air 731 to flow into the cowling.

In the embodiment depicted, the cowling 720 is a configured as a telescoping structure, with the larger diameter upper portion 722 moveable upwardly or downwardly with respect to the smaller diameter lower portion 724 to adjust the inner volume of the cowling. The structure and capillary media 712 are attached to and suspended in the cowling 720 by an exhaust riser 707 and a clamp collar 726 as previously described. A fan 704 or other air moving device is positioned on or in the exhaust riser 707 to direct airflow 706 from the exhaust riser, which thus induces airflow 731 into the vent holes 730 in the lower portion of the cowling. Dry air thus flows into the cowling through the vent holes 730, and travels generally upwardly across and through the capillary media 712 and through the center of the support structure 713, with wet air (having absorbed moisture from the capillary media) exhausted through the exhaust riser 707.

As seen in the figure, in this embodiment, with the upper portion 722 of the cowling 720 movable with respect to the lower portion 724 of the cowling, the amount of capillary media 712 extending below the lower portion of the cowling may be effectively adjusted, i.e., by moving the upper portion of the cowling upwardly, less capillary media extends below and into the water, and vice versa.

Looking still to FIG. 11, with the entire cowling and float base assembly disposed within the outer chamber 733, the water level within the outer chamber 733 may be regulated by limiting the amount of water permitted into the outer chamber 733 through inlet opening 703. Thus, the amount of water comprising the body of water 701 within the outer chamber and the position of the water surface 702 may be controlled. Dry air enters the outer chamber 733 through vent opening 705 in the outer chamber.

With the lower edge of the capillary media resting on the floor 735 of the outer chamber 733, and with the water level within the chamber adjustable as just described, and with the positioning of the capillary media with respect to the float base 732 as described above, it can be seen that the capillary media may be moved/adjusted with respect to the Jurin level to allow different areas of the capillary media to be positioned at that desired level. Thus, rather than simply removing and replacing the capillary media as it becomes saturated with solids captured from the water being remediated, the capillary media may be moved with respect to the Jurin level (via adjusting the telescoping cowling and/or by adjusting the water level within the outer chamber) so that the capillary media is more efficiently used to remediate the water.

Thus, for example, by starting with the outer chamber is full to the point where only enough capillary material is exposed to account for the efficient portion capillary action and then slowly lowering the water level as the media above is expended, the evaporation can remain focused on the zone where the greatest evaporation will occur while storing precipitated solids in the spent media above.

Figure 12:
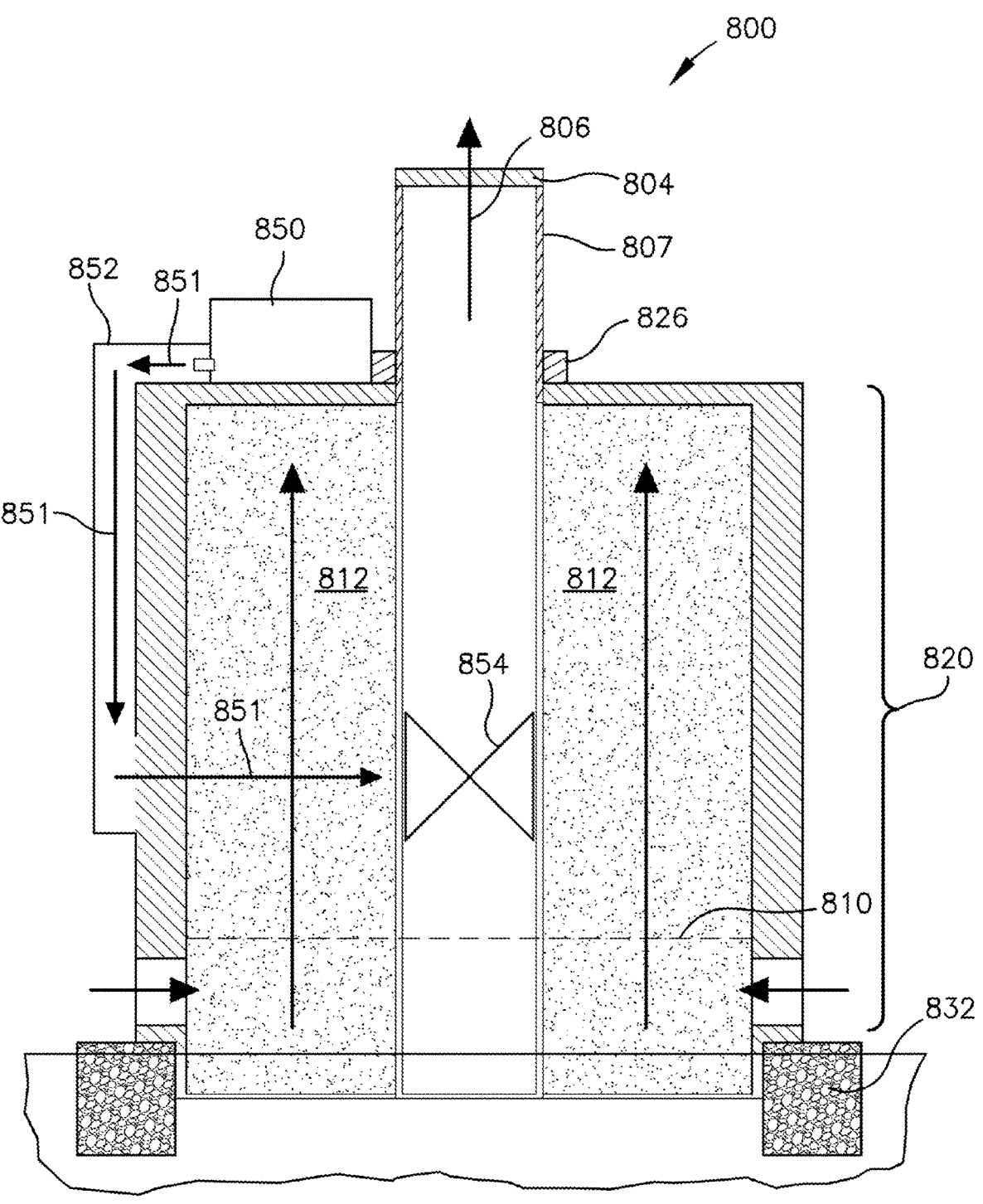
FIG. 12 is a diagrammatic cross-sectional and airflow view of an enclosure and capillary media in accordance with a third exemplary embodiment of the present invention.

Looking to a further embodiment as depicted in FIG. 12, the evaporation of the system will be increased if either the air or the water, or both, are heated. In the exemplary embodiment of FIG. 12, this may be accomplished by heating the air before it enters the apparatus or by heating water in the media (or both). As seen in the exemplary system 800 of FIG. 12, heating the water in the media can be accomplished by exposing the media and water above the water source to microwaves.

In a manner similar to that described above with respect to the embodiment of FIG. 12, the system 800 comprises a cowling 820 attached to float base 832, with a structure and capillary media 812 positioned within the cowling, with an exhaust riser 807 attached via a clamp collar 826 to the cowling 820. The capillary media 812 is positioned to extend into the water with vent holes allowing external air to enter just below the Jurin level 810 on the media.

A magnetron 850 emits microwaves that are directed by a waveguide 852 along the side of the cowling and towards a wave disperser 854 positioned within the center of the structure. The wave disperser 854 acts to disperse the directed microwaves such that they heat the water within the apparatus. In this embodiment, the conductive cowling further acts as a Faraday cage.

As can be seen, the systems and methods of the present invention as just described are well adapted for removing contaminants from groundwater or other water sources using a capillary media, and without requiring the use of pumps or otherwise requiring movement of the water to be remediated.

While the system and method of the present invention have been described herein with respect to exemplary embodiments, it should be understood that other configurations and arrangements are within the scope of the present invention. Furthermore, many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for groundwater remediation, comprising:
a capillary media configured to absorb water and propagate the water from a first portion of the media to a second portion of the media via capillary action;
a structure for supporting the capillary media within a contaminated water source such that the capillary media is partially submerged and partially exposed so that contaminated water is drawn upwardly through the capillary media via capillary action to precipitate soluble materials from the contaminated water onto the capillary media upon evaporation of the water from the exposed portion of the capillary media;
an air source permitting air to circulate around the capillary media to facilitate evaporation of water from the exposed portion of the capillary media;
a float base comprised of a buoyant material, wherein the structure is attached to the float base such that the structure is supported on the float base and such that the float base floats on the surface of the contaminated water source; wherein the capillary media and the air source are enclosed within an open-bottom cowling having a lower rim positioned at or below the surface of the contaminated water source and an upper exhaust outlet positioned above the surface of the contaminated water source, the cowling thereby defining a controlled airflow path from beneath the rim, through the partially exposed portion of the capillary media, and out the upper exhaust outlet;
wherein the structure comprises a radially oriented spoke-and-panel support centered below the upper exhaust outlet and configured to support a plurality of capillary media panels while providing open passages between adjacent panels to facilitate upward airflow; and
wherein the exhaust outlet comprises a telescopically height-adjustable riser.

2. The system of claim 1, further comprising a heat source operable to heat the capillary media, the contaminated water, the air, and combinations thereof.

3. The system of claim 2, wherein the heat source comprises microwave heater comprising a magnetron microwave emitter configured to generate microwaves.

4. The system of claim 3, wherein the capillary media is seeded with microwave conducive materials to enhance the heating of the capillary media by the generated microwaves.

5. The system of claim 3, further comprising a reflector positioned to reflect the generated microwaves toward the capillary media.

6. The system of claim 1, further comprising a fan configured to circulate air across the capillary media to enhance the evaporation of water from the exposed portion of the capillary media.

7. The system of claim 6, further comprising an exhaust riser in fluid communication with the fan to direct air drawn across the capillary media and outwardly away from the contaminated water source.

8. The system of claim 1, wherein the support structure comprises a center open area and a series of outwardly extending spokes for supporting a plurality of capillary media panels.

9. The system of claim 1, further comprising a cowling having an open bottom configured to surround and substantially enclose the support structure and capillary media.

10. The system of claim 9, wherein the cowling comprises an upper surface having an aperture therethrough to allow airflow upwardly and out of the cowling.

11. The system of claim 10, wherein an exhaust riser is attached to the cowling surrounding the aperture to direct airflow from the aperture.

12. The system of claim 9, wherein the cowling comprises separable upper and lower portions to allow access to the contained capillary media.

13. The system of claim 9, wherein the cowling comprises a larger diameter upper portion and a smaller diameter lower portion such that the two portions may be moved in a telescoping manner with respect to each other to vary an internal volume of the cowling.

14. The system of claim 9, further comprising a waveguide attached to an outer wall of the cowling to direct microwaves along the wall of the cowling and towards the contained capillary media.

15. A method for groundwater remediation, comprising:

supplying a capillary media configured to absorb water and propagate the water from a first portion of the media to a second portion of the media via capillary action;

positioning a structure for supporting the capillary media onto a float base and disposing the float base, structure, and capillary media within a contaminated water source such that the capillary media is partially submerged and partially exposed so that contaminated water is drawn upwardly through the capillary media via capillary action to precipitate soluble materials from the contaminated water onto the capillary media upon evaporation of the water from the exposed portion of the capillary media;

providing an air source permitting air to circulate around the capillary media to facilitate evaporation of water from the exposed portion of the capillary media;

enclosing the capillary media and circulating air within an open-bottom cowling having a lower rim positioned at or below a surface of the contaminated water source and an upper exhaust outlet positioned above the water surface to define a controlled airflow path from beneath the rim, through the exposed portion of the capillary media, and out the upper exhaust outlet;

supporting the capillary media on a radially oriented spoke-and-panel frame centered below the upper exhaust outlet to maintain open airflow passages between adjacent panels; and adjusting a telescoping exhaust riser associated with the upper exhaust outlet to vary a height of the upper exhaust outlet.

16. The method of claim 15, further comprising providing a heat source operable to heat the capillary media, the contaminated water, the air, and combinations thereof.

17. The method of claim 16, wherein the heat source comprises microwave heater comprising a magnetron microwave emitter configured to generate microwaves.

18. The method of claim 17, wherein the capillary media is seeded with microwave conducive materials to enhance the heating of the capillary media by the generated microwaves.

19. The method of claim 15, further comprising providing a fan configured to circulate air across the capillary media to enhance the evaporation of water from the exposed portion of the capillary media.

20. The method of claim 15, further comprising removing the capillary media and extracting precipitated materials.

* * * * *